US012559030B2

(12) United States Patent
Bravo Corbacho et al.

(10) Patent No.: US 12,559,030 B2
(45) Date of Patent: Feb. 24, 2026

(54) FOLDING ACTUATOR COVER ASSEMBLY

(71) Applicant: FicoMirrors, S.A.U., Barcelona (ES)

(72) Inventors: David Bravo Corbacho, Viladecavalls (ES); Robert Lopez Galera, Viladecavalls (ES)

(73) Assignee: FICOMIRRORS, S.A.U., Barcelona (ES)

( * ) Notice: Subject to any disclaimer, the term of this patent is extended or adjusted under 35 U.S.C. 154(b) by 54 days.

(21) Appl. No.: 18/174,880

(22) Filed: Feb. 27, 2023

(65) Prior Publication Data

US 2023/0278496 A1 Sep. 7, 2023

(30) Foreign Application Priority Data

Mar. 4, 2022 (EP) ..................................... 22382202

(51) Int. Cl.
B60R 1/074 (2006.01)
B60R 1/07 (2006.01)
B60R 1/072 (2006.01)

(52) U.S. Cl.
CPC ................ B60R 1/074 (2013.01); B60R 1/07 (2013.01); B60R 1/072 (2013.01)

(58) Field of Classification Search
CPC ........... B60R 1/074; B60R 1/07; B60R 1/072; B60R 1/02; B60R 1/0617; B60R 1/062
USPC ....................................................... 248/479
See application file for complete search history.

(56) References Cited

U.S. PATENT DOCUMENTS

| | | | | |
|---|---|---|---|---|
| 4,158,483 A | * | 6/1979 | Fisher | B60R 1/072 |
| | | | | 359/876 |
| 5,020,896 A | * | 6/1991 | Vercesi | B60R 1/072 |
| | | | | 359/876 |
| 5,172,884 A | * | 12/1992 | Ishiyama | B60R 1/074 |
| | | | | 248/479 |
| 6,257,731 B1 | | 7/2001 | Oh | |
| 6,857,754 B2 | * | 2/2005 | Fukai | B60R 1/072 |
| | | | | 359/872 |
| 6,981,774 B2 | | 1/2006 | Dumont et al. | |
| 7,354,165 B1 | * | 4/2008 | Ruse | B60R 1/076 |
| | | | | 248/478 |
| 8,366,285 B2 | | 2/2013 | Reedman et al. | |
| 9,033,526 B2 | | 5/2015 | Schuurmans et al. | |
| 9,308,866 B2 | | 4/2016 | Palvoelgyi et al. | |
| 10,099,618 B2 | * | 10/2018 | Foote | B60R 1/074 |
| 10,315,578 B2 | * | 6/2019 | Kim | G01S 17/931 |
| 10,661,728 B2 | * | 5/2020 | Tsuji | B60R 13/105 |

(Continued)

OTHER PUBLICATIONS

European Search Report for European Application No. 22382202; dated Aug. 24, 2022; 2 pages.

*Primary Examiner* — Nkeisha Smith
(74) *Attorney, Agent, or Firm* — CANTOR COLBURN LLP

(57) ABSTRACT

A folding actuator cover assembly (100) comprises at least a first cover component (110) in a first plane (P1) and having a first receiving portion (120) for receiving a first driving mechanism for rotating the first cover component (110) with respect to a vehicle body portion (10), and a second cover component (130) in a second plane (P2) for attaching a mirror pane (190) of a rear-view system (150). The first plane (P1) is at an angle of 70-110° with respect to the second plane (P2). The second cover component (130) is configured as an extension of the first cover component (110).

20 Claims, 2 Drawing Sheets

(56) References Cited

U.S. PATENT DOCUMENTS

| 10,766,418 | B2 | | 9/2020 | Motomiya et al. | |
|---|---|---|---|---|---|
| 11,007,939 | B1 | * | 5/2021 | Wilson | B60R 1/07 |
| 11,110,863 | B2 | * | 9/2021 | Mendoza Vicioso | B60R 1/074 |
| 2002/0006003 | A1 | | 1/2002 | Kato et al. | |
| 2012/0087026 | A1 | * | 4/2012 | Schuurmans | B60R 1/076 |
| | | | | | 359/841 |
| 2019/0359138 | A1 | * | 11/2019 | Yoshida | B60R 16/027 |

* cited by examiner

FOLDING ACTUATOR COVER ASSEMBLY

CROSS-REFERENCE TO RELATED APPLICATIONS

This application claims the benefit of European Application Serial No. 22382202.4 filed Mar. 4, 2022, the disclosure of which is incorporated herein by reference in its entirety.

BACKGROUND

The present disclosure relates to a folding actuator cover assembly and a rear-view mirror system for motor vehicles comprising such folding actuator cover assembly.

Rear-view mirror systems comprise a mounting assembly or winglet pivotally attached to an outer fixed part of a motor vehicle and a reflective member mounted for angular movement to the mounting assembly.

A winglet actuator is provided including driving means that comprise an electric motor arranged for driving the winglet in rotation between a non-driving position where the mounting assembly is folded inwards when the vehicle is parked for protection purposes and a driving position where the mounting assembly is projected outwards from the vehicle when the vehicle is traveling for driving purposes.

A reflective member actuator is also provided for adjusting the orientation of the reflective member from within the vehicle.

A vehicle rear-view mirror system is known from U.S. Pat. No. 6,981,774 in which the reflective member actuator comprises first drive means for pivoting the reflective member on a first axis and second drive means for pivoting the reflective member on a second axis perpendicular to the first axis. Control means comprising a single rotating drive motor device are provided for selectively actuating the first and second drive means.

So far, known rear-view mirror systems have been shown to be undesirably complex and costly. A need still exists for improved rear-view mirror systems which at least partially overcomes the above issues.

SUMMARY

The above disadvantages are overcome by the present folding actuator cover assembly and the present rear-view mirror system for motor vehicles with which important advantages and benefits are also obtained.

The present folding actuator cover assembly comprises at least a first cover component and a second cover component. In one example, the first cover component may be removably attached to the second cover component, although it may be envisaged that the first cover component and the second cover component are formed integrally with each other.

The first cover component may comprise an upper actuator cover and a bottom actuator cover. Upper and bottom refers herein to positions of the actuator covers with respect to the vehicle when mounted thereto. The first cover component and, in particular, the upper actuator cover, is arranged in a first plane. The first cover component has a first receiving portion for receiving a first driving mechanism for rotating the first cover component with respect to a vehicle body portion. The upper actuator cover and the bottom actuator cover may be rotated together with respect to a vehicle body portion.

The second cover component is arranged in a second plane. The second cover component is configured for attaching a mirror pane directly or indirectly, for example, with the use of a mirror pane regulator.

According to an important feature of the present folding actuator cover assembly, the above mentioned first plane is positioned at an angle of 70-110° with respect to the above mentioned second plane. It may be preferred that the first plane is perpendicular to the second plane. Further, the first plane may be inclined at an angle of ±20° to the ground when in use with the rear-view system operatively installed in the vehicle.

According to another important feature of the present folding actuator cover assembly, the above mentioned second cover component is configured as an extension of at least one of the upper and bottom cover components. Said extension may be intended, for example, for supporting a functional element. Said functional element may be any element intended for performing a specific function, and it may be an electrical device, for example, a mirror pane, a video camera, a photo camera, a light, a blinker, a radar, a LIDAR, a sensor, an actuator such as a mirror pane regulation actuator, and so forth. The extension may be integrally formed with of at least one of the upper and bottom cover components or it may be removably formed therewith. The extension may be integrally formed for example with the upper actuator cover or it may be removably formed therewith. Said extension may be configured for performing the function of receiving the functional element, without enclosing the driving means.

Preferably, the upper actuator cover is arranged projecting from a central portion of the second cover component. In particular, the upper actuator cover may be arranged extending less than 30 mm from the central portion of the second cover component. As used herein, the first cover component arranged extending from the second cover component refers to an extending length taken from an edge of the second cover component.

The second cover component may have a second receiving portion for receiving a second driving mechanism, as a mirror pane regulator, for driving the mirror pane of the rear-view system.

The second cover component may be substantially circular in shape. For example, the second cover component may be 60-100 mm in diameter.

According to an advantageous feature of the present folding actuator cover assembly, when positioned on a vehicle. a first dimension of the first cover component may extend along a substantially transverse direction of the vehicle towards the outside. A length of the upper actuator cover along the substantially transverse direction of the vehicle may be for example 60-100, with 80 mm being preferred. It may be also advantageous that a second dimension of the upper actuator cover extends 20-40 mm along a vertical direction of the vehicle. Also, a length of the upper actuator cover along a longitudinal direction of the vehicle may be for example 60-100, with 80 mm being preferred.

A longitudinal dimension of the upper actuator cover together with the second cover component along the substantially transverse direction of the vehicle towards the outside of the vehicle is larger than a longitudinal dimension of the bottom actuator cover along the same transverse direction of the vehicle.

As used herein, a longitudinal direction of the vehicle refers to a direction of travel of the vehicle while a transverse direction of the vehicle refers to a direction extending perpendicular to the vehicle's direction of travel. As used herein, a vertical direction of the vehicle refers to a direction extending perpendicular to the ground. A longitudinal dimension of a part refers to a length of that part.

A coupling arrangement may be further provided in the folding actuator cover assembly for attachment of the upper actuator cover and the bottom actuator cover to each other.

The folding actuator may include a motor for driving a shaft that is arranged parallel to the upper actuator cover. However, other types of driving means may be envisaged.

A rear-view mirror system for motor vehicles is also disclosed herein. The present rear-view mirror system comprises a foot projecting from a vehicle body portion. The rear-view mirror system further comprises a rear-view mirror head that is attached to said foot. The rear-view mirror head includes the mirror pane that is attached to the second cover component, and the folding actuator as described above. In use, both the upper actuator cover and the bottom actuator cover move together with the mirror head, that is, there is no relative movement between the upper actuator cover and the bottom actuator cover.

It is envisaged that the first driving mechanism and the second driving mechanism are configured to operate independently of each other.

With the above-mentioned arrangement, with a first plane on which the first receiving portion lies for receiving a first driving mechanism for rotating the first cover component, arranged at an angle of ±20° to the ground when in use, with the rear-view mirror system operatively attached to the vehicle, the first driving mechanism, such as for example an electric motor, is advantageously positioned horizontal or substantially horizontal to the ground. This results in small sized assembly, in particular, small in a dimension along a vertical axis, so a highly compact assembly obtained having the combination of the features described above.

A rear-view mirror system provided with such folding actuator is highly compact and small sized since a small number of parts are involved and the foot can be placed in a position other than under the head. Improved aerodynamics, lower coefficient of friction, and reduced overall weight are advantageously achieved resulting in reductions in fuel consumption.

The present rear-view mirror system has an integral structure that includes functional elements together with folding or regulation capabilities. Thus, the structural part of the rear-view mirror acts as chassis of the mirror pane and also as actuator part therefor. In particular, the rear-view mirror system can be electrically operated for moving the mirror pane of the rear-view mirror system vertically and horizontally together or not with the rear-view mirror head.

Due to the fact that the second cover component is configured as an extension of the first cover component for supporting a functional element, the folding actuator cover assembly acts as functional element integrator without any accessory parts. No extra frame parts are required for supporting the functional element on the peripheral function assembly. As a result, a cost-effective assembly is achieved.

Additional objects, advantages, and features of examples of the present folding actuator cover assembly and rear-view mirror system for motor vehicles will become apparent to those skilled in the art upon examination of the description or may be learned by practice thereof.

BRIEF DESCRIPTION OF THE DRAWINGS

Particular examples of the folding actuator cover assembly and the rear-view mirror system for motor vehicles will be described in the following by way of non-limiting examples, with reference to the appended drawings.

In the drawings.

DETAILED DESCRIPTION

Figure 1:
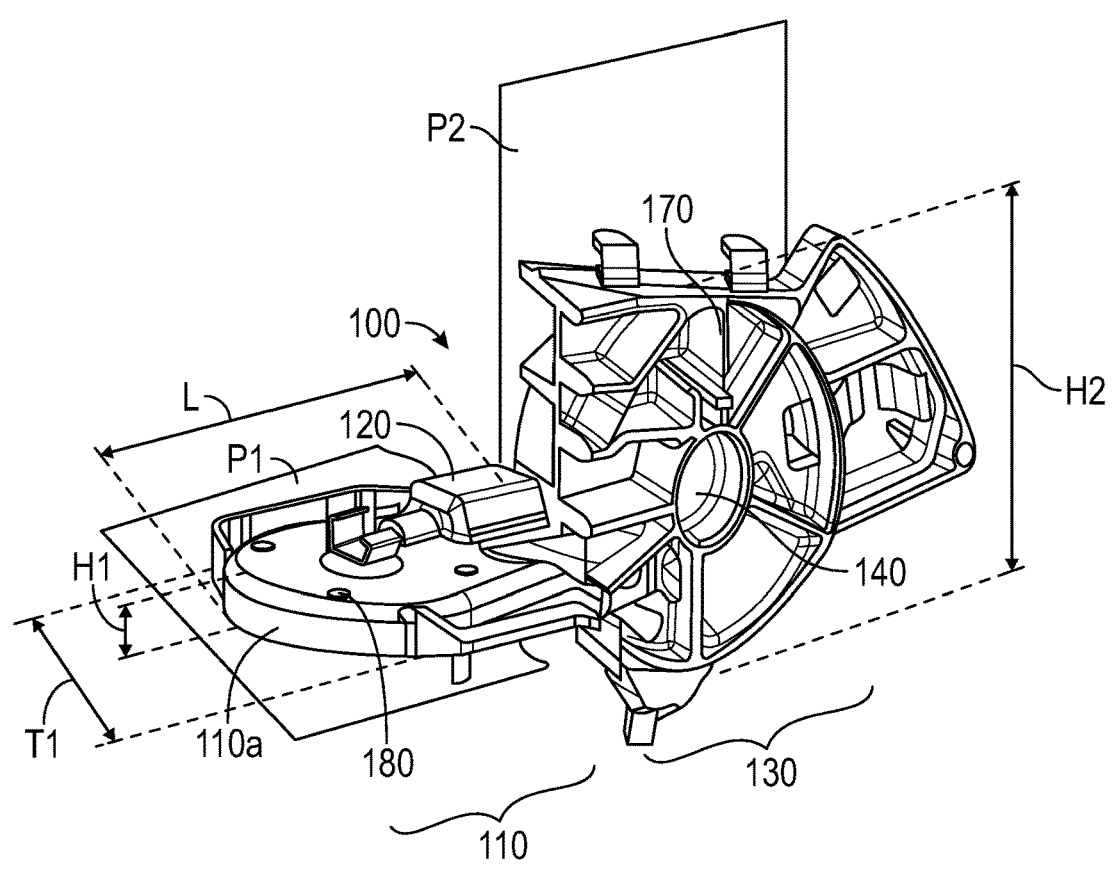
FIGS. 1 and 2 of the drawings show one example of a rear-view mirror system for motor vehicles as viewed from different angles provided with a folding actuator cover assembly.

The rear-view mirror system 150 in the example shown comprises a foot 155. The foot 155 is arranged projecting from a portion 10 of the vehicle, in this example, from a door of the vehicle. The rear-view mirror system 150 further comprises a rear-view mirror head 160 that is attached to said foot 155. The rear-view mirror head 160 in turn includes a mirror pane 190, shown in FIG. 3, that is attached to a second cover component 130 of a folding actuator cover assembly 100 that will be described in detail below, and a mirror housing 200.

The rear-view mirror system 150 also comprises the above mentioned folding actuator cover assembly 100. In the example shown, the folding actuator cover assembly 100 comprises a first cover component 110 and a second cover component 130. The first cover component 110 and the second cover component 130 may be removably attached to each other.

The first cover component 110 comprises an upper actuator cover 110a and a bottom actuator cover 110b and is also attached to the second cover component 130. One of the second cover component 130 and the first cover component 110 is attached to the mirror head 160 for rotating the mirror head 160 relative to the foot 155. In the example of the figures, the first cover component 110 comprises an upper actuator cover 110a and a bottom actuator cover 110b. It may be envisaged that the upper actuator cover 110a and the second cover component 130 are formed integrally with each other depending on requirements.

The upper actuator cover 110a is arranged in a first plane P1 diagrammatically illustrated in FIG. 1 of the drawings. The upper actuator cover 110a has a first receiving portion 120. The first receiving portion 120 of the first cover component 110 is configured for receiving a first driving mechanism, such as for example an electric motor, shown in FIG. 3, for rotating the first cover component 110 with respect to a vehicle body portion 10. The second cover component 130 is arranged in a second plane P2 diagrammatically illustrated in FIG. 1 of the drawings. The second cover component 130 is configured for attaching the mirror pane 190 directly or indirectly through an intermediate element as a mirror pane back plate 196 or a mirror pane regulator actuator 197 of the rear-view system 150.

As shown in the Figures, the first plane P1 is perpendicular to the second plane P2. In general, the first plane P1 may be positioned at an angle of 70-110° with respect to the second plane P2. The first plane P1 is parallel to the ground when the mirror assembly is operatively attached to the vehicle as shown in FIG. 1 although it may be inclined at an angle of ±20° to the ground.

A first dimension L of the upper actuator cover 110a extends along a transverse direction x of the vehicle. The first dimension L of the upper actuator cover 110a may be 60-100 mm, preferably 80 mm.

Figure 2:
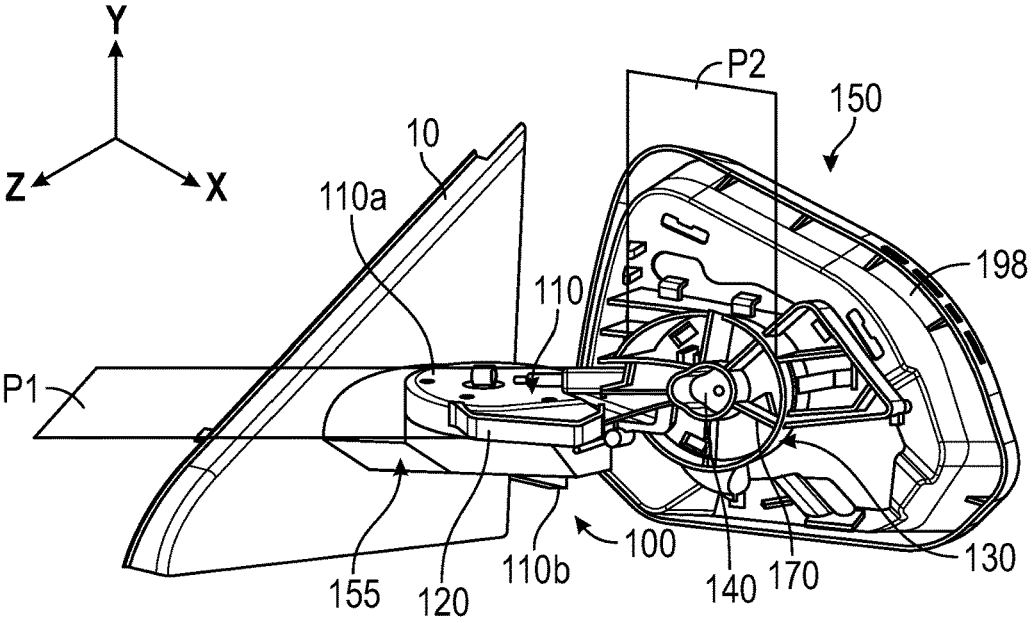

A width T1 of the upper actuator cover 110a along a direction substantially parallel to the longitudinal direction of the vehicle is 60-100 mm, preferably 80 mm. A second dimension H1 or thickness of the upper actuator cover 110a extends 20-40 mm, with 30 mm being preferred, along a vertical direction y of the vehicle when in use as shown in FIG. 2.

A longitudinal direction refers to a direction of travel z of the vehicle. A transverse direction x of the vehicle refers to a direction x extending perpendicular to the vehicle's direction of travel z, and a vertical direction y of the vehicle refers to a direction y extending perpendicular to the ground. As a result, the rear-view system 150 is small in size, in particular, in the dimension along vertical axis y. A highly compact assembly is obtained.

The second cover component 130 in the example shown in the Figures is substantially circular in shape and 60-100 mm in diameter H2, with 80 mm being preferred. Other shapes and sizes are possible, therefore, the maximum length in a vertical direction y should be 60-100 mm, with 80 mm being preferred. In any case, the second cover component 130 is configured as an extension of the upper actuator cover 110a. That is, the second cover component 130 is formed extending from the upper actuator cover 110a. The purpose of the second cover component 130 is supporting a functional element such as an electrical device, for example, a mirror pane (shown in FIG. 3), a camera, a light, a blinker, a radar, a sensor, etc.

Therefore, the relationship between the vertical dimension of second actuator cover 130 and the upper actuator cover 110a should be higher than 150%, and more preferably between 150% and 500%.

In the non-limiting example illustrated in the Figures of the drawings, the upper actuator cover 110a is arranged extending less than 30 mm from the central portion of the second cover component 130.

A second receiving portion 140 is formed in the second cover component 130. The second receiving portion is configured for receiving a second driving mechanism or mirror pane regulator 197, such as an electric motor, shown in FIG. 3, for driving the mirror pane 190 of the rear-view system 150. Other types of driving mechanisms are possible. In any case, the first driving mechanism and the second driving mechanism may be configured to operate independently of each other or synchronously.

A longitudinal dimension of the upper actuator cover 110a and the second cover component 130 along the transverse direction x of the vehicle is in this example larger than a longitudinal dimension of the bottom actuator cover 110b along said transverse direction x of the vehicle towards the outside of the vehicle. The longitudinal dimension of the upper or bottom actuator covers 110a, 110b refers to the length of that parts.

The longitudinal dimension of the upper actuator cover 110a and the second cover component 130 along this transverse direction is at least 30%, more preferably 45%, optimally 60% the length of the bottom actuator cover 110b.

Figure 3:
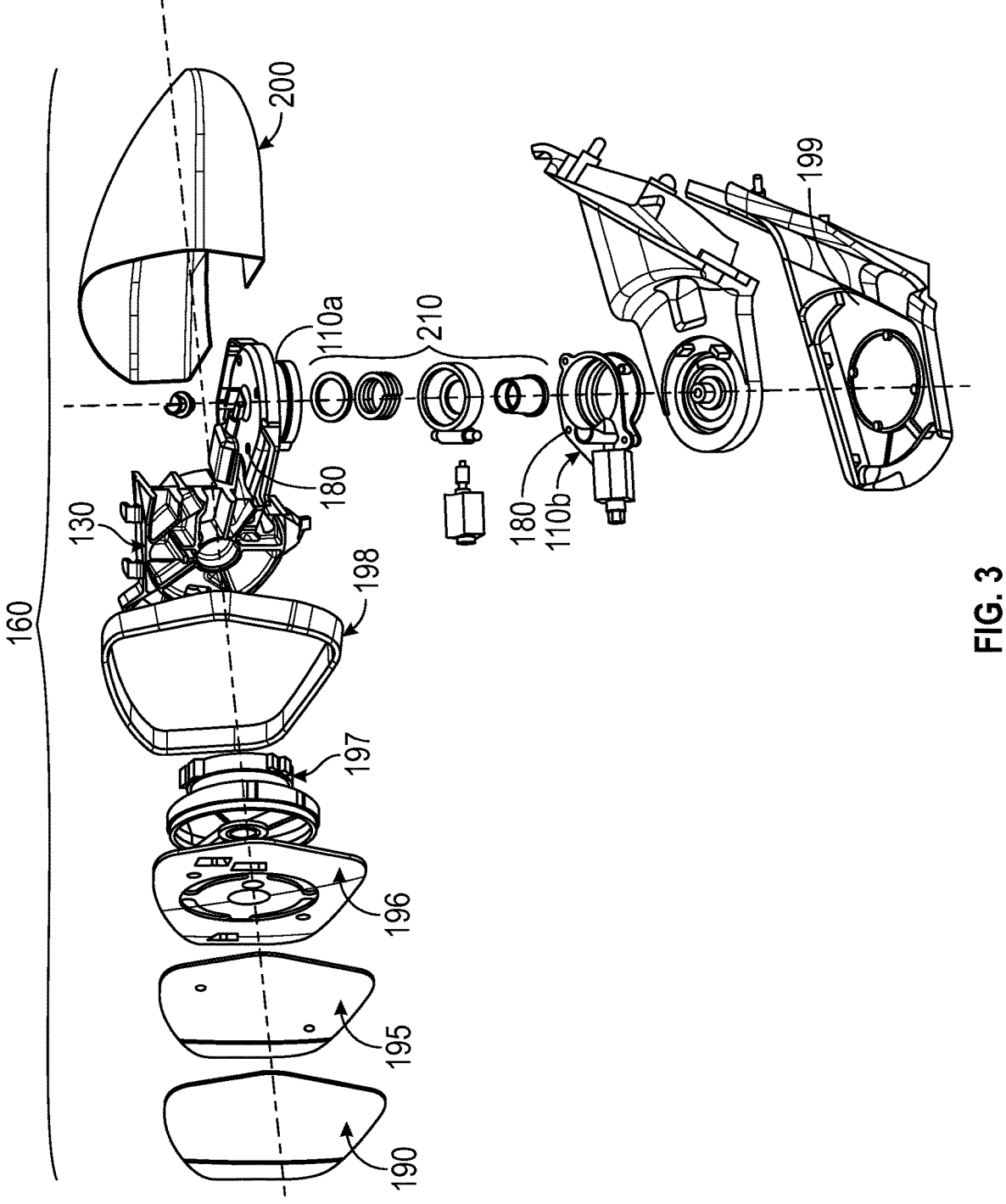
FIG. 3 is an exploded perspective view of the rear-view mirror system for motor vehicles.

As shown in FIGS. 1 and 3, the folding actuator cover assembly 100 has a coupling arrangement 180, for attachment of the upper actuator cover 110a and the bottom actuator cover 110b to each other.

Shown in the exploded perspective view of FIG. 3 of the drawings is an example of the present rear-view mirror system 150. The rear-view mirror system 150 in the example shown comprises the mirror pane 190 as mentioned above and a mirror heating 195 adhesively attaching the mirror pane 190 to the mirror back plate 196. The mirror back plate 196 is in turn intended be attached to the mirror pane regulator 197 associated with the second driving mechanism. A mirror frame 198 is arranged to be attached to the above-mentioned mirror housing 200. A foot cover 199 is also provided which may comprise a folding actuator cover. The above-mentioned coupling arrangement 180 is also shown in this Figure comprising screw holes in upper and bottom actuator covers 110a, 110b for attachment thereof to each other through any attachment means as screws. A drive arrangement 210 comprising a motor, gearing and other components of the first driving mechanism is also provided.

Radially stiffening elements 170 are provided in the second cover component 130 as shown in Figure.

At least one of the first cover component 110 and the second cover component 130 may be made of plastic or metal such as aluminium or any suitable aluminium alloy.

Although only a particular example of the present actuator cover assembly and rear-view mirror system for motor vehicles has been disclosed herein, it will be understood by those skilled in the art that other alternative examples and/or uses and obvious modifications and equivalents thereof are also possible. The present disclosure covers all possible combinations of the particular examples described. Reference signs related to drawings and placed in parentheses in a claim, are solely for attempting to increase the intelligibility of the claim and shall not be construed as limiting the scope of the claim. The scope of the present disclosure should not be limited by particular examples but should be determined only by a fair reading of the following claims.

What is claimed is:

1. A folding actuator cover assembly comprising:
   at least a first cover component arranged in a first plane and having a first receiving portion for receiving a first driving mechanism for rotating the first cover component with respect to a vehicle body portion; and
   a second cover component arranged in a second plane for attaching a mirror pane of a rear-view system, wherein the first plane is positioned at an angle of 70-110° with respect to the second plane and wherein the second cover component is configured as an extension of the first cover component;
   wherein the first cover component comprises an upper actuator cover and a bottom actuator cover and wherein the upper actuator cover and the second cover component are formed integrally with each other.

2. The folding actuator cover assembly as claimed in claim 1, wherein the first plane is inclined at an angle of ±20° to the ground.

3. The folding actuator cover assembly as claimed in claim 1, wherein the first cover component and the second cover component are formed integrally with each other.

4. The folding actuator cover assembly as claimed in claim 1, wherein the upper actuator cover is arranged extending from a central portion of the second cover component.

5. The folding actuator cover assembly as claimed in claim 4, wherein the upper actuator cover is arranged extending less than 30 mm from the central portion of the second cover component.

6. The folding actuator cover assembly as claimed in claim 1, wherein the second cover component has a second receiving portion for receiving a second driving mechanism for driving the mirror pane of the rear-view system.

7. The folding actuator cover assembly as claimed in claim 1, wherein the first plane is perpendicular to the second plane.

8. The folding actuator cover assembly as claimed in claim 1, wherein a relationship between a vertical dimension of second cover component and the upper actuator cover is higher than 150%, and more preferably between 150% and 500%.

9. The folding actuator cover assembly as claimed in claim 1, wherein a longitudinal dimension of the upper actuator cover is larger than a longitudinal dimension of the actuator bottom cover.

10. The folding actuator cover assembly as claimed in claim 1, wherein the second cover component is substantially circular in shape.

11. The folding actuator cover assembly of claim 1, wherein the upper actuator cover and the bottom actuator cover are configured to be rotated together with respect to the vehicle body portion.

12. A rear-view mirror system for motor vehicles, comprising:

a foot projecting from a vehicle body portion;

a rear-view mirror head attached to the foot including a mirror pane; and the folding actuator cover assembly as set forth in claim 1, wherein at least one of the first cover component and the second cover component is attached to the mirror head for rotating the mirror head relative to the foot, and the mirror pane is attached to the second cover component.

13. The rear-view mirror system as claimed in claim 12, wherein the second cover component has a second receiving portion for receiving a second driving mechanism for driving the mirror pane of the rear-view mirror system; and wherein the first driving mechanism and the second driving mechanism are configured to operate independently of each other.

14. A folding actuator cover assembly comprising:

at least a first cover component arranged in a first plane and having a first receiving portion for receiving a first driving mechanism for rotating the first cover component with respect to a vehicle body portion; and a second cover component arranged in a second plane for attaching a mirror pane of a rear-view system, wherein the first plane is positioned at an angle of 70-110° with respect to the second plane and wherein the second cover component is configured as an extension of the first cover component;

wherein the first cover component comprises an upper actuator cover and a bottom actuator cover, and wherein the second cover component is removably attached to the upper actuator cover;

wherein the upper actuator cover is arranged extending from a central portion of the second cover component.

15. A folding actuator cover assembly comprising:

at least a first cover component arranged in a first plane and having a first receiving portion for receiving a first driving mechanism for rotating the first cover component with respect to a vehicle body portion; and a second cover component arranged in a second plane for attaching a mirror pane of a rear-view system, wherein the first plane is positioned at an angle of 70-110° with respect to the second plane and wherein the second cover component is configured as an extension of the first cover component;

wherein a relationship between a vertical dimension of second cover component and the first cover component is higher than 150%, and more preferably between 150% and 500%.

16. The folding actuator cover assembly as claimed in claim 15, wherein the first plane is inclined at an angle of ±20° to the ground.

17. The folding actuator cover assembly as claimed in claim 15, wherein the first cover component comprises an upper actuator cover and a bottom actuator cover, and wherein the second cover component is removably attached to the upper actuator cover.

18. The folding actuator cover assembly as claimed in claim 15, wherein the second cover component has a second receiving portion for receiving a second driving mechanism for driving the mirror pane of the rear-view system.

19. The folding cover actuator assembly as claimed in claim 15, wherein the first plane is perpendicular to the second plane.

20. A rear-view mirror system for motor vehicles, comprising:

a foot projecting from a vehicle body portion;

a rear-view mirror head attached to the foot including the mirror pane; and the folding actuator cover assembly as set forth in claim 15, wherein at least one of the first cover component and the second cover component is attached to the mirror head for rotating the mirror head relative to the foot, and the mirror pane is attached to the second cover component.

\* \* \* \* \*